United States Patent
Choi et al.

(10) Patent No.: US 12,093,031 B2
(45) Date of Patent: Sep. 17, 2024

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventors: Jung Eun Choi, Seoul (KR); Jae Pil Hwang, Seoul (KR); Wan Jae Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 23 days.

(21) Appl. No.: 17/545,807

(22) Filed: Dec. 8, 2021

(65) Prior Publication Data
US 2022/0413483 A1 Dec. 29, 2022

(30) Foreign Application Priority Data
Jun. 25, 2021 (KR) .................. 10-2021-0083394

(51) Int. Cl.
| | | |
|---|---|---|
| G05D 1/00 | (2024.01) | |
| G01C 21/34 | (2006.01) | |
| G01C 21/36 | (2006.01) | |
| G05D 1/02 | (2020.01) | |

(52) U.S. Cl.
CPC ....... *G05D 1/0011* (2013.01); *G01C 21/3415* (2013.01); *G01C 21/367* (2013.01); *G05D 1/0214* (2013.01)

(58) Field of Classification Search
None
See application file for complete search history.

(56) References Cited

U.S. PATENT DOCUMENTS

| | | | |
|---|---|---|---|
| 8,849,494 B1* | 9/2014 | Herbach | G05D 1/0044 701/24 |
| 10,133,270 B2 | 11/2018 | Michalakis et al. | |
| 10,317,899 B2 | 6/2019 | Liu et al. | |
| 2018/0364700 A1 | 12/2018 | Liu et al. | |
| 2019/0025842 A1* | 1/2019 | Kim | B60W 30/00 |
| 2019/0384304 A1* | 12/2019 | Towal | G06N 3/045 |
| 2020/0004239 A1* | 1/2020 | Pedersen | G05D 1/0088 |

(Continued)

FOREIGN PATENT DOCUMENTS

| | | | |
|---|---|---|---|
| JP | 2007257094 A | * | 10/2007 |
| JP | 2013217742 A | * | 10/2013 |

(Continued)

OTHER PUBLICATIONS

Machine translation of JP 2007257094 A (Year: 2007).*
Machine translation of JP-2019185293-A (Year: 2019).*
Machine translation of JP-2013217742-A (Year: 2013).*

*Primary Examiner* — Amelia Vorce
*Assistant Examiner* — Kyle S Park
(74) *Attorney, Agent, or Firm* — MORGAN, LEWIS & BOCKIUS LLP

(57) ABSTRACT

An autonomous vehicle may include an autonomous driving control apparatus having a processor that transmits vehicle data and a vehicle path for remote control of the autonomous vehicle to a control system when the remote control of the autonomous vehicle is required, and performs following and control based on adjusted path information when receiving the adjusted path information from the control system.

17 Claims, 15 Drawing Sheets

(56) References Cited

U.S. PATENT DOCUMENTS

| | | | | |
|---|---|---|---|---|
| 2020/0041995 A1* | 2/2020 | Quillin | ................ | G05D 1/0022 |
| 2020/0269877 A1* | 8/2020 | Mortazavi | ............ | G08G 1/0116 |
| 2020/0293038 A1 | 9/2020 | Laurent et al. | | |
| 2020/0409368 A1* | 12/2020 | Caldwell | .............. | G05D 1/0088 |
| 2021/0080943 A1* | 3/2021 | Iwamoto | ................. | G08G 1/01 |
| 2022/0081001 A1* | 3/2022 | Xia | .................... | B60W 30/095 |
| 2022/0113722 A1* | 4/2022 | Feng | .................... | G06F 3/0488 |
| 2022/0194419 A1* | 6/2022 | Houshmand | ....... | B60W 60/0011 |
| 2022/0397898 A1* | 12/2022 | Urano | ................. | G05D 1/0038 |

FOREIGN PATENT DOCUMENTS

| | | | | | |
|---|---|---|---|---|---|
| JP | 2015-230692 A | | 12/2015 | | |
| JP | 2019185293 A | * | 10/2019 | ............ | F16H 3/097 |
| JP | 2020-003890 A | | 1/2020 | | |
| KR | 10-2112684 B | | 6/2020 | | |

\* cited by examiner

AUTONOMOUS VEHICLE, CONTROL SYSTEM FOR REMOTELY CONTROLLING THE SAME, AND METHOD THEREOF

CROSS-REFERENCE TO RELATED APPLICATION

The present application claims priority to Korean Patent Application No. 10-2021-0083394, filed on Jun. 25, 2021, the entire contents of which is incorporated herein for all purposes by this reference.

BACKGROUND OF THE INVENTION

Field of the Invention

The present invention relates to an autonomous vehicle, a control system for remotely controlling the same, and a method thereof, and more particularly, to a technique for remotely controlling a path of the autonomous vehicle by the control system.

Description of Related Art

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or a passenger.

While driving in an autonomous driving mode, there may be a situation in which it is impossible to follow a driving path to the destination normally although there is no abnormality in a function of the vehicle. Accordingly, when a situation where it is impossible to follow a path occurs during autonomous driving, it is often difficult to follow the driving path, such as when the driver directly intervenes in control of the vehicle or when the driver's intervention is difficult, the vehicle stops.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous vehicle, a control system for remotely controlling the same, and a method thereof, configured for facilitating the autonomous vehicle to follow and control an adjusted path by transmitting the adjusted path from the control system to the autonomous vehicle when a situation where it is impossible to follow a driving path of the autonomous vehicle occurs.

The technical objects of the present invention are not limited to the objects mentioned above, and other technical objects not mentioned may be clearly understood by those skilled in the art from the description of the claims.

Various aspects of the present invention are directed to providing an autonomous vehicle, including an autonomous driving control apparatus having a processor that transmits vehicle data and a vehicle path for remote control of the autonomous vehicle to a control system when the remote control of the autonomous vehicle is required, and performs following and control based on adjusted path information when receiving the adjusted path information from the control system.

In various exemplary embodiments of the present invention, the processor may receive a point value of an adjusted path from the control system.

In various exemplary embodiments of the present invention, the processor may adjust a path based on the point value of the adjusted path, and determines whether the adjusted path is drivable.

In various exemplary embodiments of the present invention, the processor may transmit a result of determining whether the adjusted path is drivable to the control system.

In various exemplary embodiments of the present invention, the processor may request final confirmation to the control system when the processor concludes that the adjusted path is drivable, and follows and controls a corresponding path when receiving the final confirmation from the control system.

In various exemplary embodiments of the present invention, the processor may determine a situation in which the autonomous vehicle is unable to travel on an existing path due to a driving situation or an emergency situation as a situation requiring the remote control.

In various exemplary embodiments of the present invention, the processor may transmit at least one candidate paths including a current path of a current vehicle to the control system.

Various aspects of the present invention are directed to providing a control system including: a display device configured to display a vehicle path of an autonomous vehicle on a screen of the display device; and a processor configured to construct map information based on a current vehicle path and vehicle data received from the autonomous vehicle when remote control of the autonomous vehicle is required to display the map information on the display device, and receives adjustment of the vehicle path on the map information from an operator to transmit the adjusted vehicle path to the autonomous vehicle.

In various exemplary embodiments of the present invention, the processor may display one or more points positioned at equal intervals on the current vehicle path on the display device.

In various exemplary embodiments of the present invention, the processor adjusting the current vehicle path depending on movement of the points of the vehicle path on the map.

In various exemplary embodiments of the present invention, the processor may move the one or more points of the current vehicle path through a mouse or touch input.

In various exemplary embodiments of the present invention, the processor may distinguish the adjusted path depending on whether the adjusted path is drivable and displays the adjusted path on the display device when receiving a result of determining whether the adjusted path is drivable from the autonomous vehicle.

In various exemplary embodiments of the present invention, the processor may distinguish the adjusted path by use of at least one of a color, a line shape, a line thickness, or a line depth of the adjusted path depending on whether the adjusted path is drivable.

In various exemplary embodiments of the present invention, the processor may stepwise change at least one of the color, the line shape, the line thickness, or the line depth of the adjusted path whenever the one or more points of the current vehicle path are moved.

In various exemplary embodiments of the present invention, the processor distinguish between a path to the points moved whenever the one or more points are moved and a path to points not yet moved by use of the current on vehicle at least one of the color, the line shape, the line thickness, or the line depth.

In various exemplary embodiments of the present invention, the processor, when the current vehicle path includes a first point, a second point, and a third point, may change at least one of a color, a line shape, a line thickness, or a line depth of a path to the first point when the first point is moved.

In various exemplary embodiments of the present invention, the processor, when receiving one or more candidate paths from the vehicle, may distinguish between a main path having a high priority and other candidate paths among the one or more candidate paths by use of at least one of a color, a line shape, a line thickness, or a line depth thereof.

Various aspects of the present invention are directed to providing a remote control method for an autonomous vehicle, including: receiving a current vehicle path and vehicle data received from an autonomous vehicle when remote control of the autonomous vehicle is required; constructing and displaying map information based on the received vehicle data and the current vehicle path; receiving adjustment of the vehicle path on the map information from an operator; and transmitting the adjusted vehicle path to the autonomous vehicle.

In various exemplary embodiments of the present invention, the constructing and displaying the map information may include displaying one or more points positioned at equal intervals on the current vehicle path.

In various exemplary embodiments of the present invention, the receiving of the adjustment of the current path may include adjusting the current vehicle path depending on movement of the one or more points of the current vehicle path on a map.

According to the present technique, an adjusted path may be followed and controlled by transmitting the adjusted path from the control system to the autonomous vehicle when a situation where it is impossible to follow a driving path of the autonomous vehicle occurs, facilitating the autonomous vehicle to smoothly drive.

Furthermore, the present technique, an operator is allowed to intuitively determine a situation of the autonomous vehicle and to instruct it by intuitively displaying data of the autonomous vehicle on a screen of the control system.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
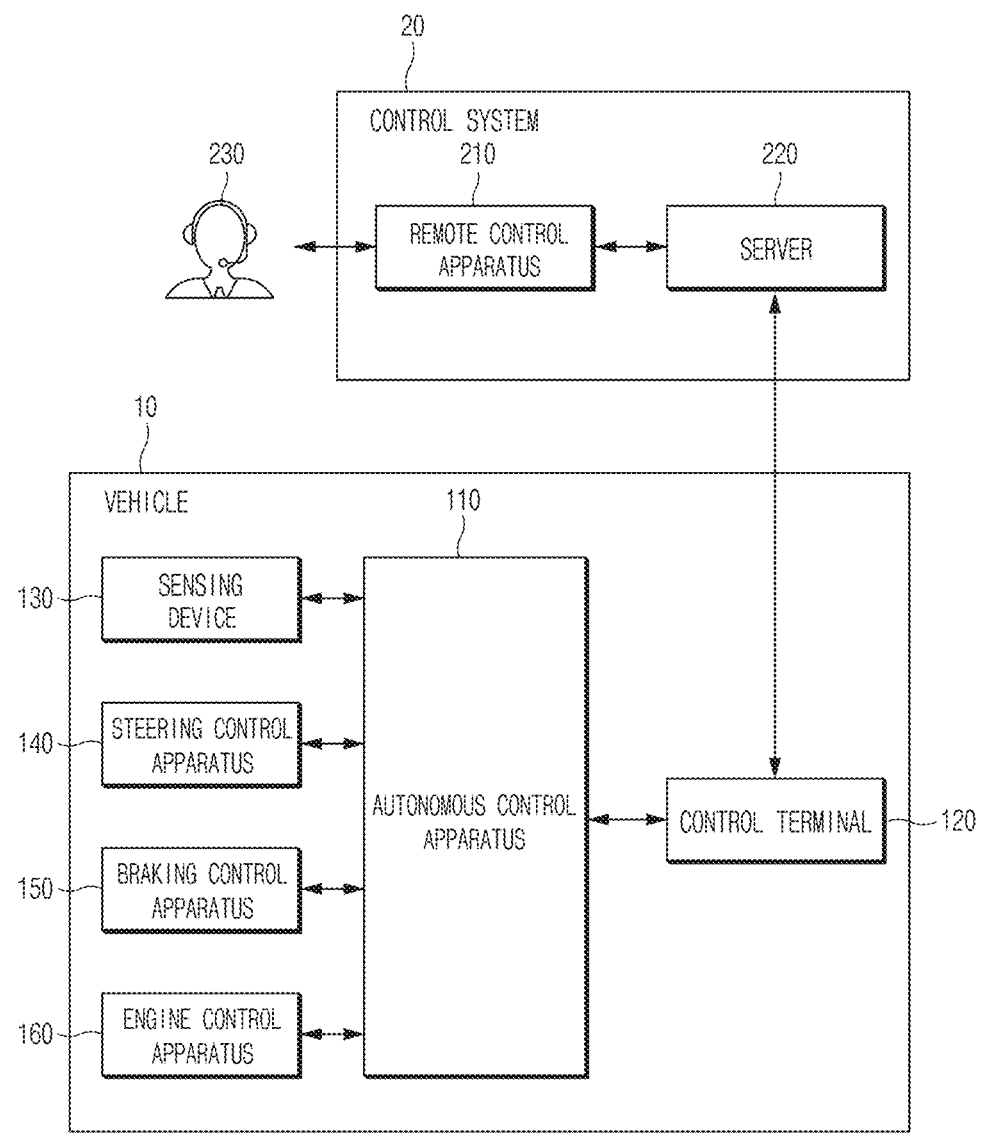
FIG. 1 illustrates a block diagram showing a configuration of a remote control system for an autonomous apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 10.

Figure 2:
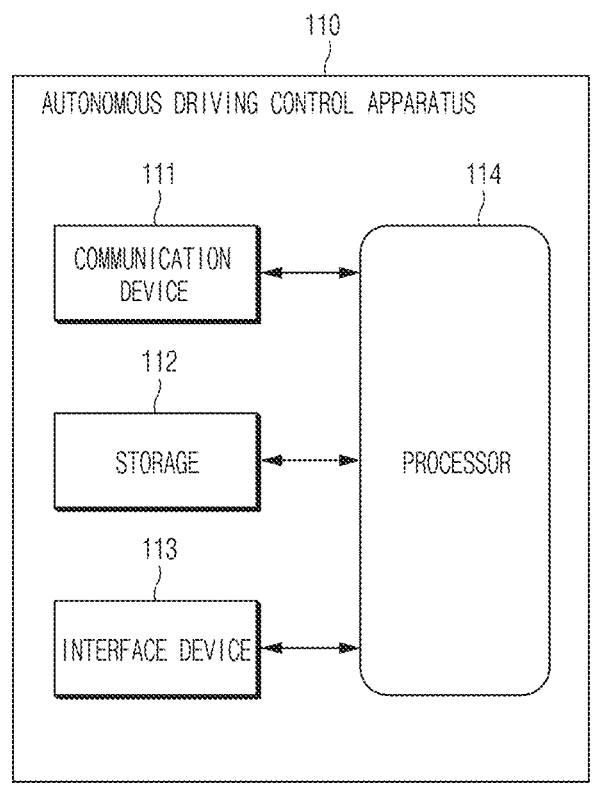
FIG. 2 illustrates a detailed schematic diagram of an autonomous driving control apparatus according to various exemplary embodiments of the present invention.
Figure 3:
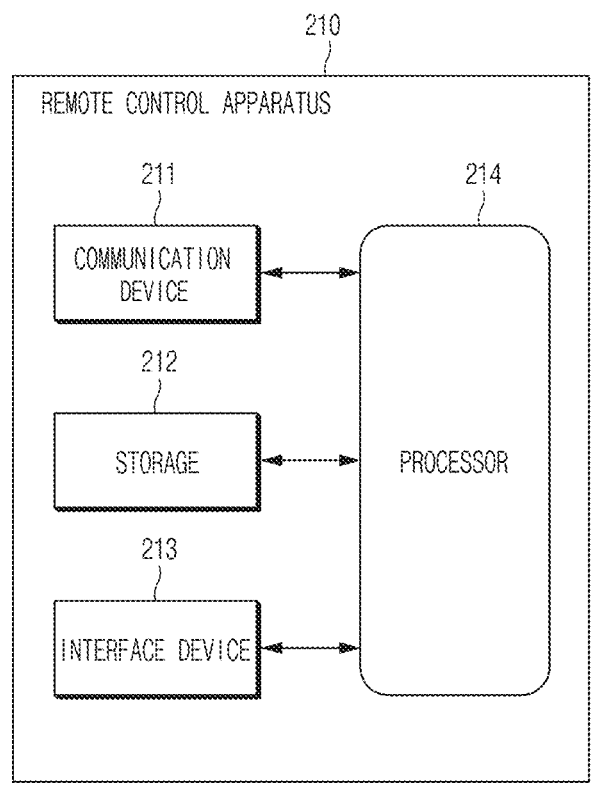
FIG. 3 illustrates a detailed schematic diagram of a remote control apparatus according to various exemplary embodiments of the present invention.

FIG. 1 illustrates a block diagram showing a configuration of a remote control system for an autonomous apparatus according to various exemplary embodiments of the present invention, FIG. 2 illustrates a detailed schematic diagram of an autonomous driving control apparatus according to various exemplary embodiments of the present invention, and FIG. 3 illustrates a detailed schematic diagram of a remote control apparatus according to various exemplary embodiments of the present invention.

Referring to FIG. 1, the remote control system for an autonomous vehicle according to various exemplary embodiments of the present invention includes a vehicle 10 and a control system 20, and remote control may be performed through communication between the vehicle 10 and the control system 20. In the instant case, the vehicle 10 may include an autonomous vehicle.

The vehicle 10 may include an autonomous driving control apparatus 110, a control terminal 120, a sensing device 130, a steering control apparatus 140, a braking control apparatus 150, and an engine control apparatus 160.

The autonomous driving control apparatus 100 according to the exemplary embodiment of the present invention may be implemented inside the vehicle. In the instant case, the autonomous driving control apparatus 100 may be integrally formed with internal control units of the vehicle, or may be implemented as a separate device to be connected to control units of the vehicle by a separate connection means.

The autonomous driving control apparatus 100 may transmit vehicle data and a vehicle path for remote control of the autonomous vehicle to the control system when remote control of the autonomous vehicle is required, and may perform following and control based on adjusted path information when receiving the adjusted path information from the control system.

Referring to FIG. 1, the autonomous driving control apparatus 100 may include a communication device 111, a storage 112, an interface unit 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, and the like.

The storage 112 may store sensing results of the sensing device 130 and data and/or algorithms required for the processor 114 to operate, and the like. As an example, the storage 112 may store a current path of the vehicle, image data captured through a camera, information received from the control system 20, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the apparatus 100 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The interface device 113 may be implemented as a head-up display (HUD), a cluster, an audio video navigation (AVN), a human machine interface (HM), a user setting menu (USM), or the like.

For example, the interface device 113 may display data transmitted and received with respect to the control system 20, a driving path of the vehicle, path information received from the control system 20, and the like.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The processor 114 may be electrically connected to the communication device 111, the storage 112, the interface device 113, and the like, may electrically control each component, and may be an electrical circuit that executes software commands, performing various data processing and determinations described below.

The processor 114 may process a signal transferred between components of the autonomous driving control apparatus 100, and may perform overall control such that each of the components can perform its function normally.

The processor 114 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 114 may determine a situation in which remote control of the autonomous vehicle is required. That is, the processor 114 may determine a situation in which the vehicle cannot travel on an existing path due to a driving situation or an emergency situation as a situation requiring the remote control.

The processor 114 may transmit the vehicle data for remote control and a current path of the vehicle to the control system 20, and follow and control the corresponding path upon receiving an adjusted path from the control system 20. In the instant case, the vehicle data may include at least one of image information around the vehicle, surrounding object information, a current position of the vehicle, a current path of the vehicle, speed information of the vehicle, or indoor image information.

The processor 114 may receive a point value of the adjusted path from the control system 20, may adjust the path based on the point value of the adjusted path, and may determine whether the adjusted path is drivable. In the instant case, the determination of whether the adjusted path is drivable may include determining whether the vehicle may be dynamically driven, collision risk, and the like.

The processor 114 may transmit a result of determining whether the adjusted path is drivable to the control system 20.

When it is determined that the adjusted path is drivable, the processor 114 may request final confirmation to the control system, and may follow and control the corresponding path upon receiving the final confirmation from the control system.

The processor 114 may transmit at least one candidate path including the current path of the vehicle to the control system 20. Accordingly, it may receive one of at least one candidate path from the control system 30 to perform following and control.

The control terminal 120 may receive vehicle data, etc. from the autonomous driving control apparatus 100, and may transmit it to the control system 20. To the present end, the control terminal 120 may include a communication device such as a modem. Furthermore, the control terminal 120 may perform wireless communication with the control system 20 through a wireless communication technique. Herein, the wireless communication technique may include wireless LAN (WLAN), wireless broadband (Wibro), Wi-Fi, Worldwide Interoperability for Microwave Access (WiMAX), etc. For example, the control terminal 120 may receive a remote control command from the control system 20 to transmit it to the autonomous driving control apparatus 110.

The present invention includes an example in which the control terminal 120 separately mounted on the vehicle 10 performs communication with the control system 20, but the present invention is not limited thereto, and it may be implemented to communicate with the control system 20 through the communication device 111 of the autonomous driving control apparatus 110 without separately providing the control terminal 120.

The sensing device 130 may include one or more sensors that detect an obstacle, e.g., a preceding vehicle, positioned around the host vehicle and measure a distance with the obstacle and/or a relative speed thereof.

The sensing device 130 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). To the present end, the sensing device 200 may include an ultrasonic sensor, a radar, a camera, a laser scanner, and/or a corner radar, a Light Detection and Ranging (LiDAR), an acceleration sensor, a yaw rate sensor, a torque measurement sensor and/or a wheel speed sensor, a steering angle sensor, etc.

Furthermore, the sensing device 130 may collect implicit information related to a vehicle interior, and to the present end, the sensing device 130 may include a vehicle indoor camera. For example, the implicit information may include a case in which a passenger leaves an object in the vehicle and gets off the vehicle.

The steering control device 140 may be configured to control a steering angle of a vehicle, and may include a steering wheel, an actuator interlocked with the steering wheel, and a controller configured for controlling the actuator.

The braking control device 150 may be configured to control braking of the vehicle, and may include a controller that is configured to control a brake thereof.

The engine control device 160 may be configured to control engine driving of a vehicle, and may include a controller that is configured to control a speed of the vehicle.

Meanwhile, the control system 20 includes a remote control apparatus 210 and a server 220.

The remote control apparatus 210 may construct and display map information based on vehicle data and the current path of the vehicle received from the autonomous vehicle when remote control of the autonomous vehicle is required, and may receive adjustment of the vehicle path on the map information from an operator to transmit the adjusted vehicle path to the autonomous vehicle.

The operator may check a situation (e.g., obstacle, collision occurrence) and the path of the autonomous vehicle through a screen of the remote control apparatus 210. In the instant case, the operator is a person who is authorized to access the remote control apparatus 210, and may be disposed in a place that the access to the remote control apparatus 210 is possible, such as an office inside the vehicle or outside the vehicle.

Referring to FIG. 3, the remote control apparatus 210 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, Ethernet communication, and the like. Furthermore, the communication device 211 may communicate with the vehicle 10 instead of the server 220.

The storage 212 may store vehicle data received from the vehicle 10, vehicle path, and data and/or algorithm required for the processor 214 to operate, and the like.

As an example, the storage 212 may store a vehicle path received from the vehicle 10, image data photographed through a camera, a vehicle path selected by the operator 230, and the like.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means for receiving a control command from a user and an output means for outputting an operation state of the apparatus 200 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the instant case, the display may include at least one of a liquid crystal display (LCD), a thin film transistor liquid crystal display (TFT LCD), an organic light emitting diode display (OLED display), a flexible display, a field emission display (FED), or a 3D display.

For example, the interface device 213 may display map information in which data received from the vehicle 10, a driving path of the vehicle, a current position of the vehicle, information related to surrounding objects, and the like overlap.

For example, the interface device 213 may enable the operator 230 to move a point among current paths of the vehicle by use of a mouse or a touch method, and may receive selection of one of at least one candidate path.

For example, the interface device may include all communication terminals such as a personal computer (PC), a notebook computer, a smartphone, a tablet PC, a pad, a personal digital assistant (PDA), and a wearable device.

The processor 214 may be electrically connected to the communication device 211, the storage 212, the interface device 213, and the like, may electrically control each component, and may be an electrical circuit that executes software commands, performing various data processing and calculations described below.

The processor 214 may process a signal transferred between components of the remote control apparatus 200, and may perform overall control such that each of the components can perform its function normally. The processor 214 may be implemented in a form of hardware, software, or a combination of hardware and software, or may be implemented as microprocessor.

When the remote control of the autonomous vehicle 10 is required, the processor 214 may configure a map based on vehicle data received from the autonomous vehicle 10 and the current path of the vehicle to display it on the interface device 213. In the instant case, one or more points positioned at equal intervals on the current path of the vehicle on the map are included.

The processor 214 may adjust the current path of the vehicle depending on movement of the points of the current path of the vehicle on the map.

When receiving a result of determining whether the adjusted path is drivable from the autonomous vehicle 10, the processor 214 may distinguish the adjusted path depending on whether the adjusted path is drivable. Furthermore, the processor 214 may distinguish the adjusted path by use of at least one of a color, a line shape, a line thickness, or a line depth of the adjusted path depending on whether a previously adjusted path is drivable.

The processor 214 may stepwise change at least one of the color, the line shape, the line thickness, or the line depth of the adjusted path whenever at least one point of the current path of the vehicle moves.

The processor 214 may distinguish between a path to the points moved whenever the at least one point of the current path of the vehicle moves and a path to points not yet moved by use of at least one of the color, the line shape, the line thickness, or the line depth.

When the current path of the vehicle includes a first point, a second point, and a third point, the processor 214 may change at least one of a color, a line shape, a line thickness, or a line depth of a path to the first point when the first point is moved.

When receiving one or more candidate paths from the vehicle 10, the processor 214 may distinguish between a main path having a high priority and the other candidate paths among the one or more candidate paths by use of at least one of a color, a line shape, a line thickness, or a line depth thereof.

The server 220 may perform relay between the remote control apparatus 210 and the vehicle 10, may store vehicle data received from the vehicle 10, and may store a remote control command received from the remote control apparatus 210, and the like.

The server 220 may perform wireless communication with the control terminal 120 of the vehicle 10 through a wireless communication technique. Herein, since the wireless communication technique is the same as that of the above-described control terminal 120, a detailed description thereof will be omitted.

The present invention includes an example in which the server 220 of the control system 20 communicates with the vehicle 10, but the present invention is not limited thereto, and it may be implemented to communicate with the vehicle 10 through the communication device 211 of the remote control apparatus 210 without configuring the server 220.

Furthermore, the communication device 111 of the autonomous driving control apparatus 110 of the vehicle and the communication device 211 of the remote control apparatus 210 may directly communicate with each other.

Figure 4:
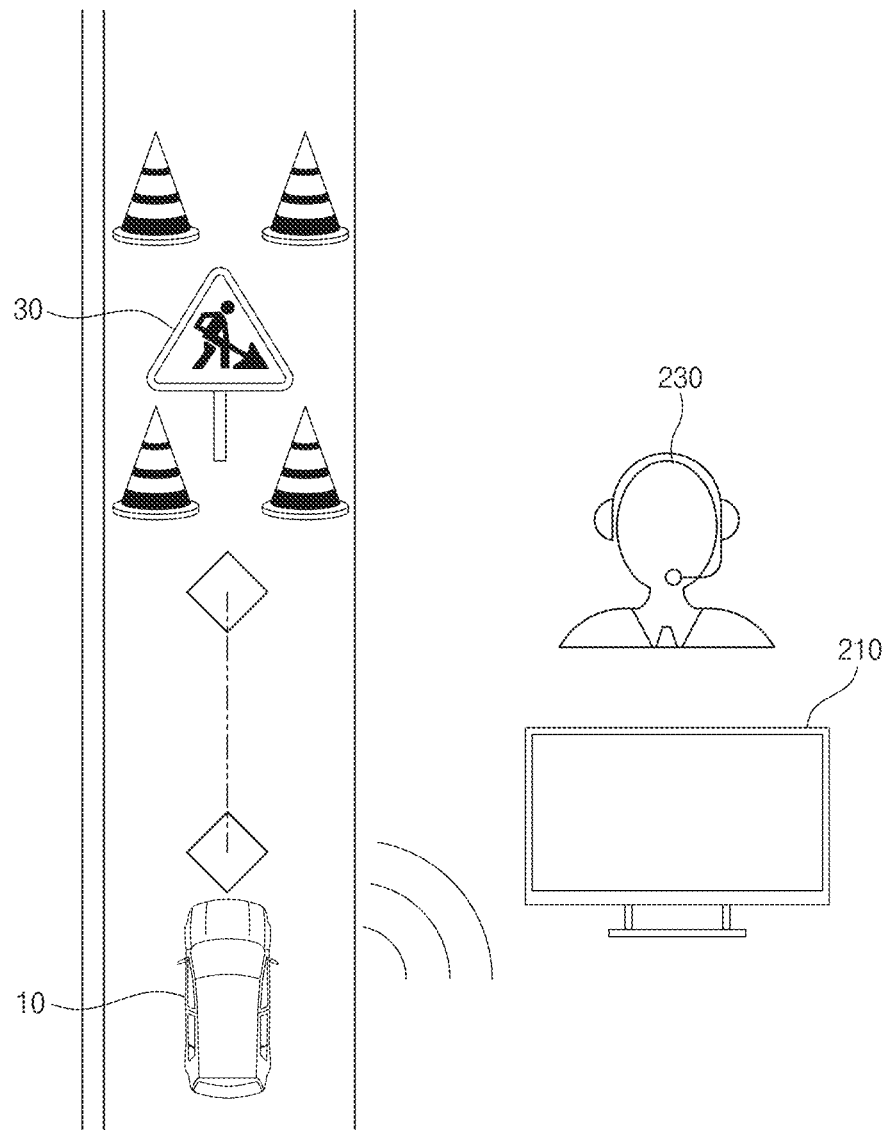
FIG. 4 illustrates a view for describing an example of a situation in which it is impossible to follow a path during autonomous driving according to various exemplary embodiments of the present invention.
Figure 5:
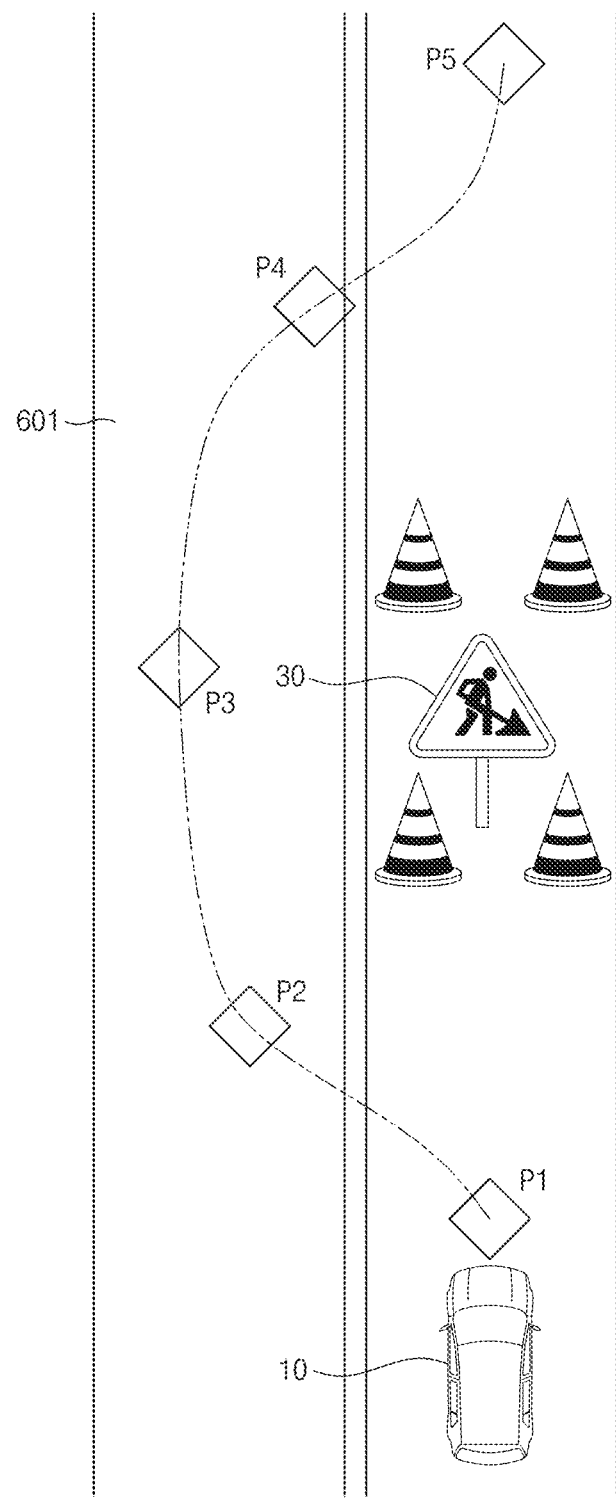
FIG. 5 illustrates a view for describing an example of adjusting a path depending on a remote control command of a remote control apparatus according to various exemplary embodiments of the present invention.

FIG. 4 illustrates a view for describing an example of a situation in which it is impossible to follow a path during autonomous driving according to various exemplary embodiments of the present invention, and FIG. 5 illustrates a view for describing an example of adjusting a path depending on a remote control command of a remote control apparatus according to various exemplary embodiments of the present invention.

Referring to FIG. 4, when road construction 30 occurs on the driving path of the autonomous vehicle 10 and a situation in which it is not possible to continue driving on the driving path occurs, the autonomous vehicle 10 determines that remote control is required.

Accordingly, the autonomous vehicle 10 transmits vehicle data to the control system 20, and the remote control apparatus 210 of the control system 20 displays a road on which the vehicle 10 is traveling, information related to surrounding objects, a position of the vehicle 10, and a driving path on a map.

Referring to FIG. 5, an operator 230 a path 601 may adjust by moving path points P1, P2, P3, P4, and P5, and the control system 20 may transmit adjusted path information to the vehicle 10.

Figure 6A:
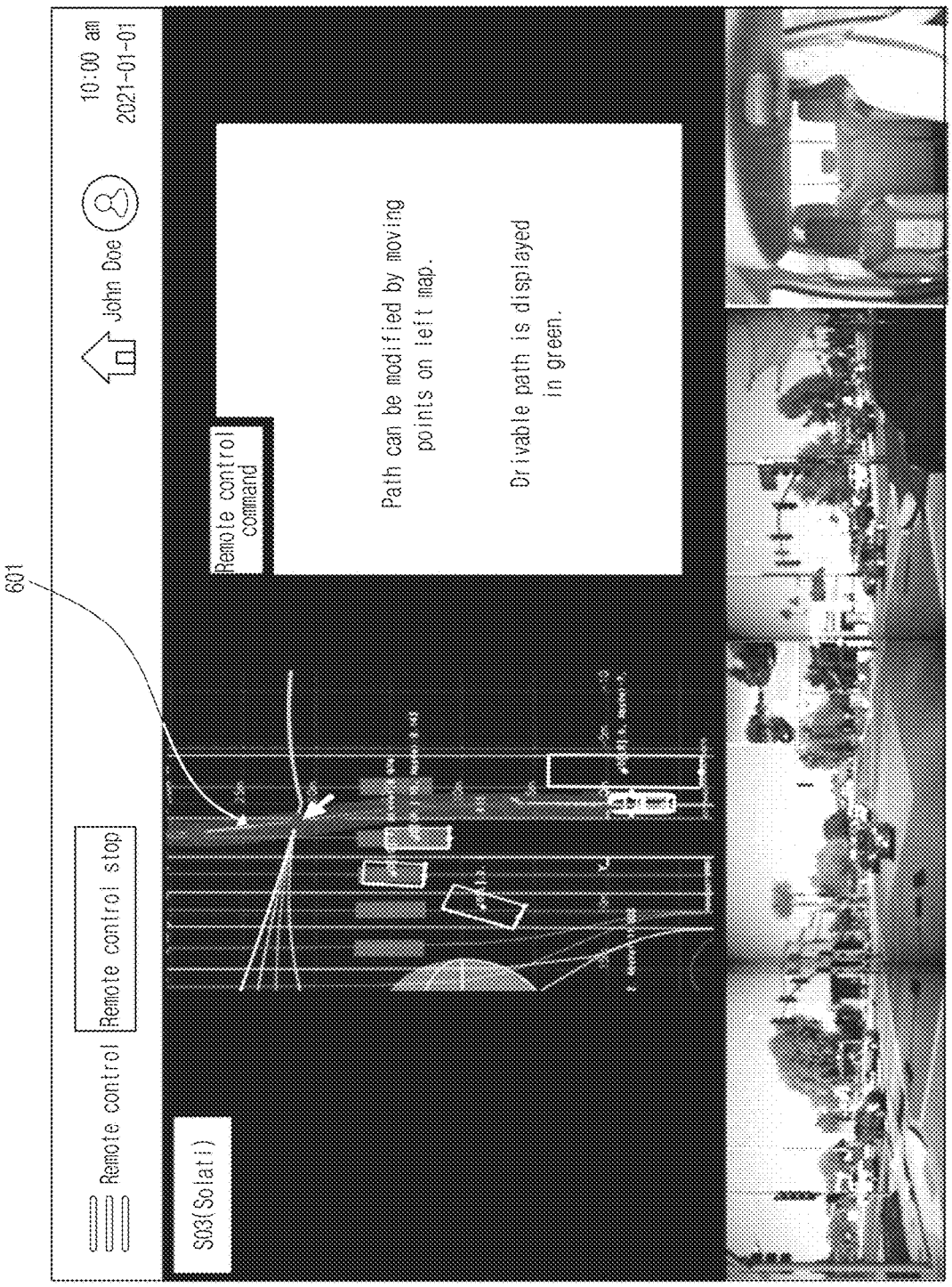
FIG. 6A illustrates an example of a screen for describing a driving impossible situation for an autonomous vehicle according to various exemplary embodiments of the present invention.
Figure 6B:
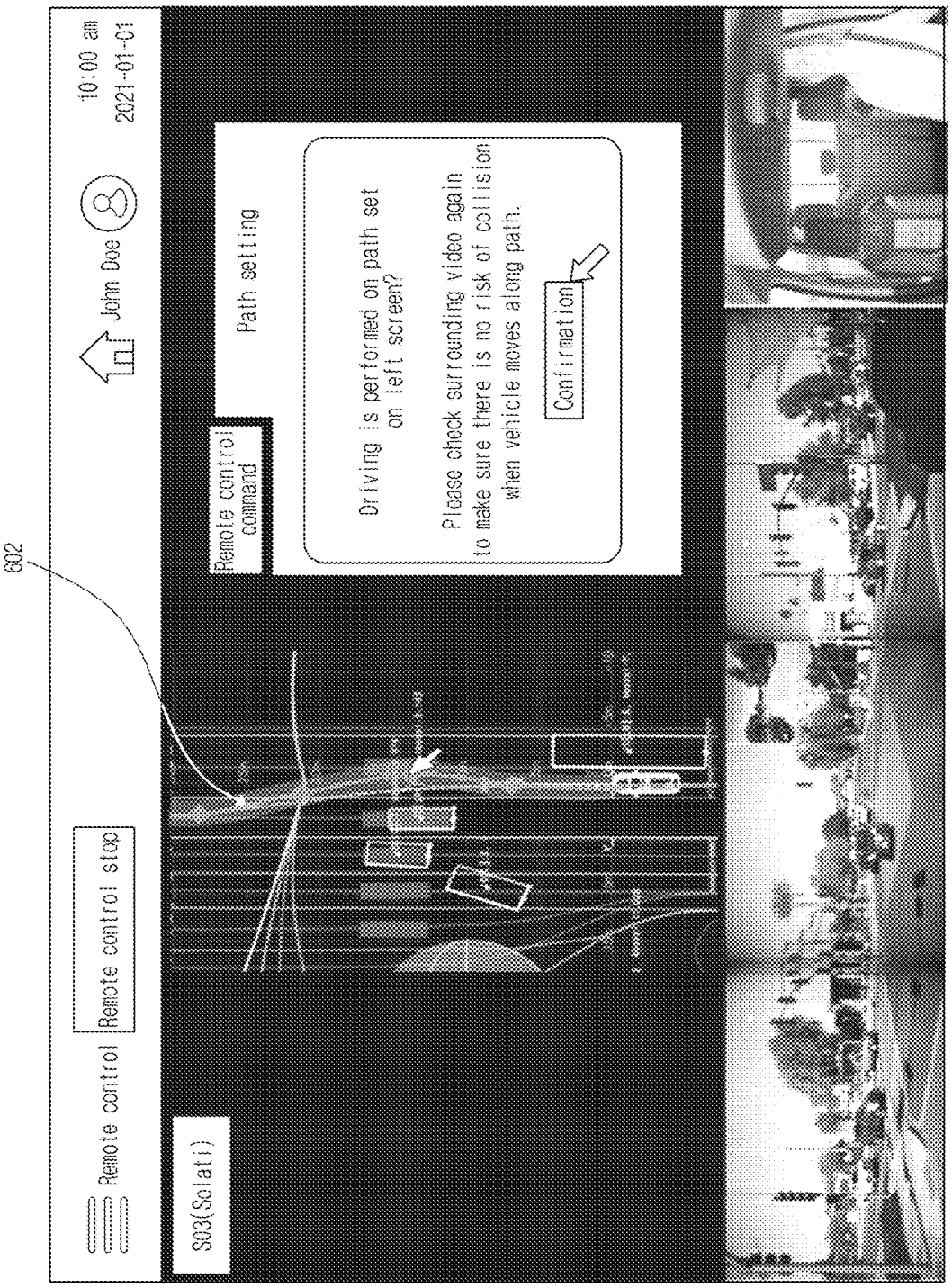
FIG. 6B illustrates an example of a screen for describing a driving possible situation of an autonomous vehicle according to various exemplary embodiments of the present invention.

FIG. 6A illustrates an example of a screen for describing a driving impossible situation for an autonomous vehicle according to various exemplary embodiments of the present invention, and FIG. 6B illustrates an example of a screen for describing a driving possible situation of an autonomous vehicle according to various exemplary embodiments of the present invention.

A path of the driving impossible situation of FIG. 6A and a path of the driving possible situation of FIG. 6B may be distinguished and displayed by color, line thickness, line depth, line shape (e.g., dotted line, solid line, etc.).

Figure 7A:
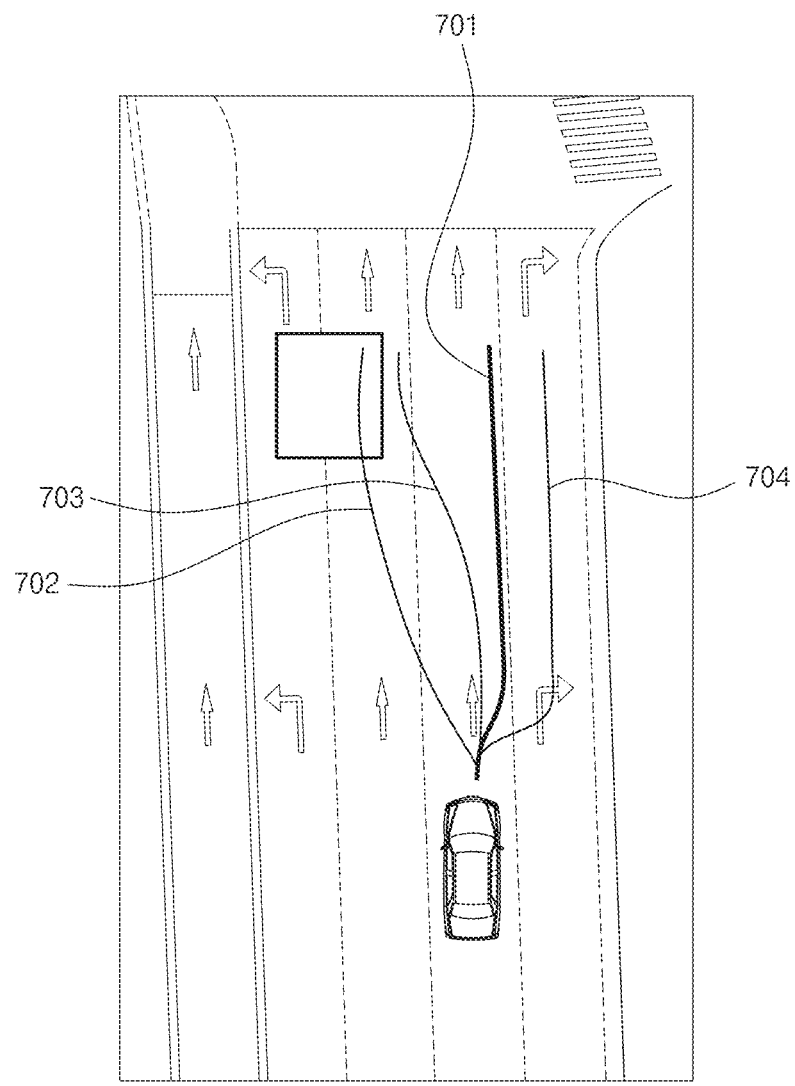
FIG. 7A and FIG. 7B illustrate examples of a screen showing a candidate path displayed on a control system according to various exemplary embodiments of the present invention.
Figure 7B:
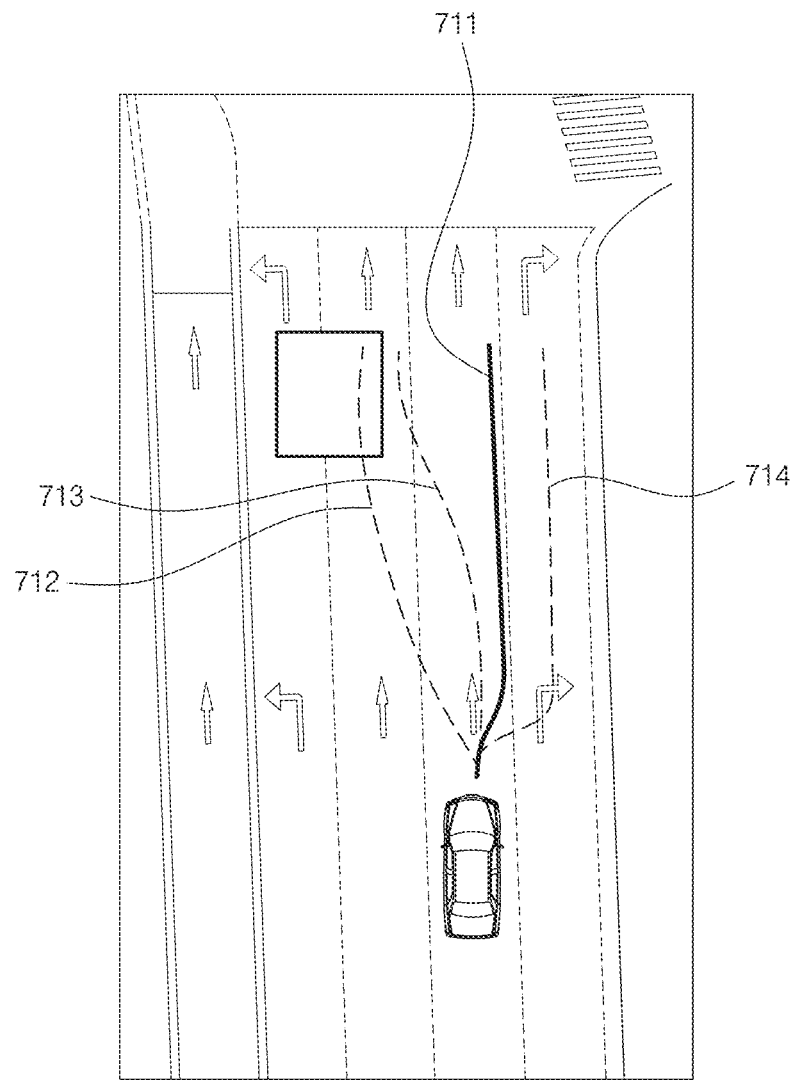

FIG. 7A and FIG. 7B illustrate examples of a screen showing a candidate path displayed on a control system according to various exemplary embodiments of the present invention.

The autonomous driving control apparatus 110 of the vehicle 10 may generate candidate path(s) including the current path of the vehicle and may transmit it to the control system 20, facilitating the operator 230 to select an optimal path among the candidate paths. Furthermore, after first adjustment of the path by the operator 230, additional adjustment is possible by moving the path points if necessary later.

Furthermore, when displaying a plurality of candidate paths received from vehicle 10 on the screen, the remote control apparatus 210 of the control system 20 may highlight the color, line type, and/or thickness of the main path, which has priority, among the candidate paths, to distinguish it from the remaining candidate paths.

That is, in FIG. 7A, a main path 701 is indicated by a thick solid line compared to remaining candidate paths 702, 703, and 704, and in FIG. 7B, a main path 711 is indicated by a thick solid line, while the remaining candidate paths 712, 713, and 714 are indicated by dotted lines.

FIG. 8A to FIG. 8D illustrate examples of a screen showing candidate paths displayed on the remote control apparatus 210 of the control system 20 according to various exemplary embodiments of the present invention. FIG. 8A to FIG. 8D may distinguish colors of paths such that the paths are visible at a glance to help the operator 230 to facilitate path adjustment.

The remote control apparatus 210 indicates driving difficulty (orange) when one path point is moved from a driving impossible state (red) and gradually changes to a driving possible state when all 4 points are moved, rather than simply changing the color of the entire path from the driving impossible state (red) to the driving possible state (green) at once. Accordingly, the operator 230 may be allowed to intuitively check whether driving is possible depending on path adjustment simply with looking directly at the screen by changing the color of the path in a gradation method.

Figure 8A:
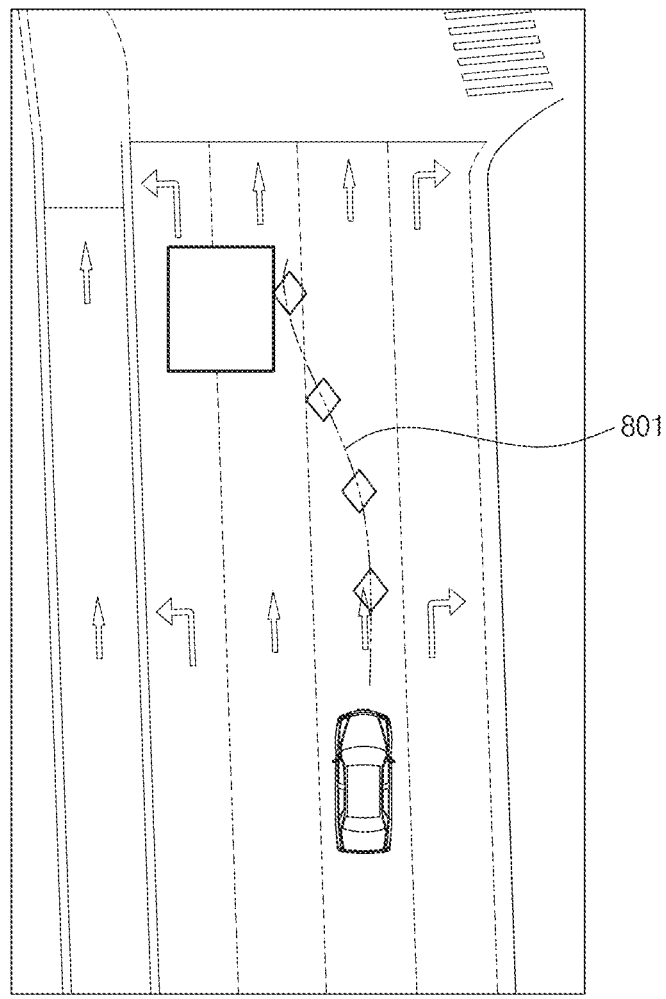
FIG. 8A to FIG. 8D illustrate examples of a screen showing a candidate path displayed on a control system according to various exemplary embodiments of the present invention.
Figure 8B:
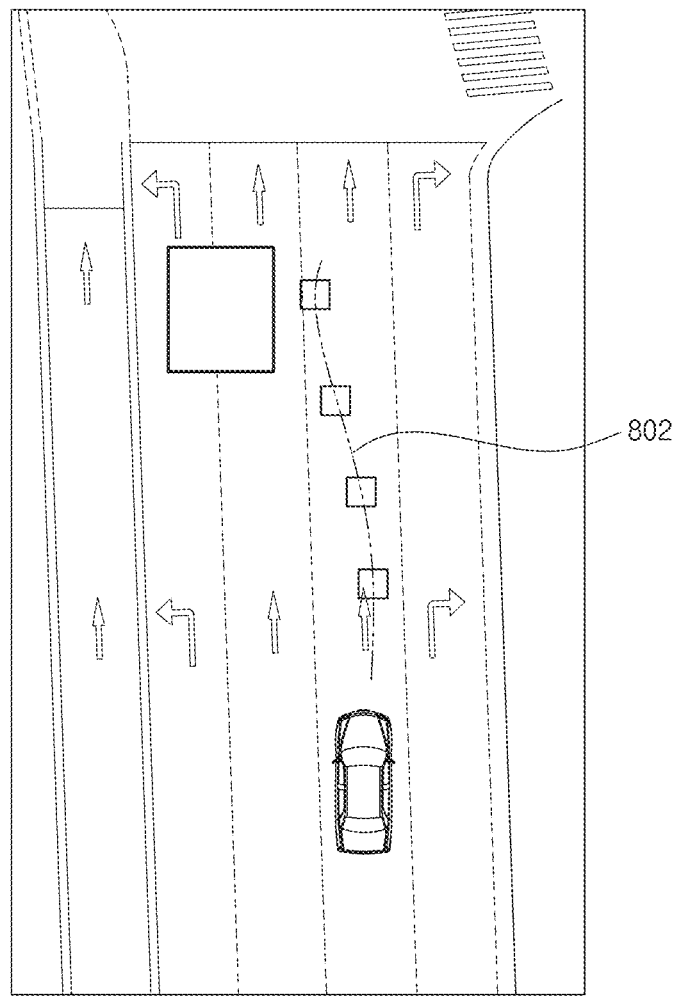
Figure 8C:
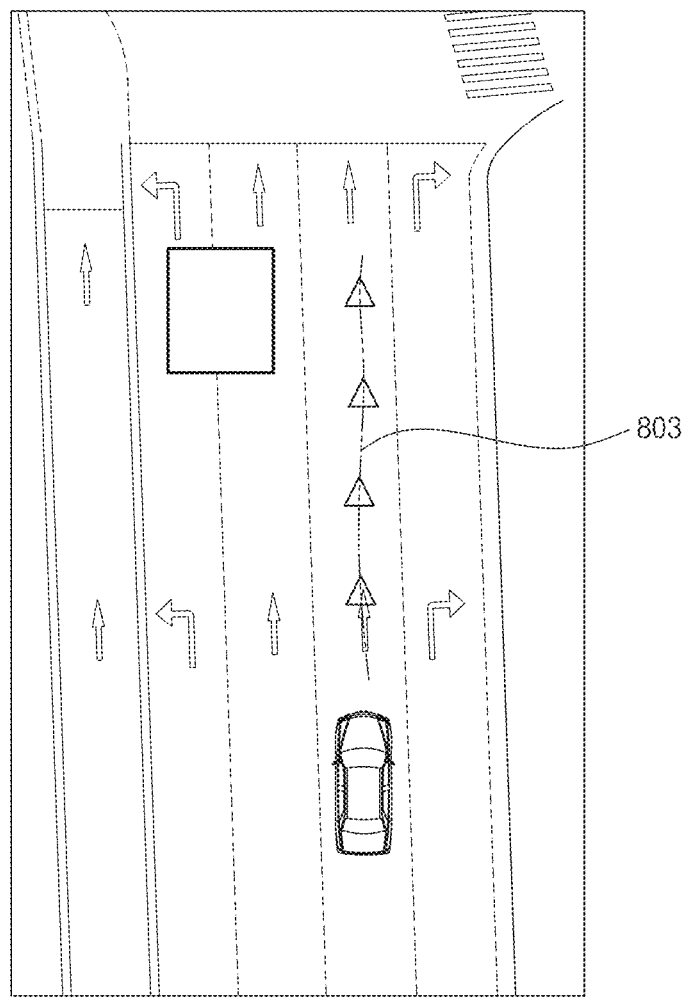

That is, the remote control apparatus 210 may provide feedback to the operator 230 as to whether the path is being adjusted in a drivable direction by gradually changing a color of a path 801 of FIG. 8A as a path 802 of FIG. 8B and a path 803 of FIG. 8C. Accordingly, in the case where the color is continuously red without changing the color even when the path point is moved, the operator 230 may recognize that adjustment in a different direction is necessary.

Figure 8D:
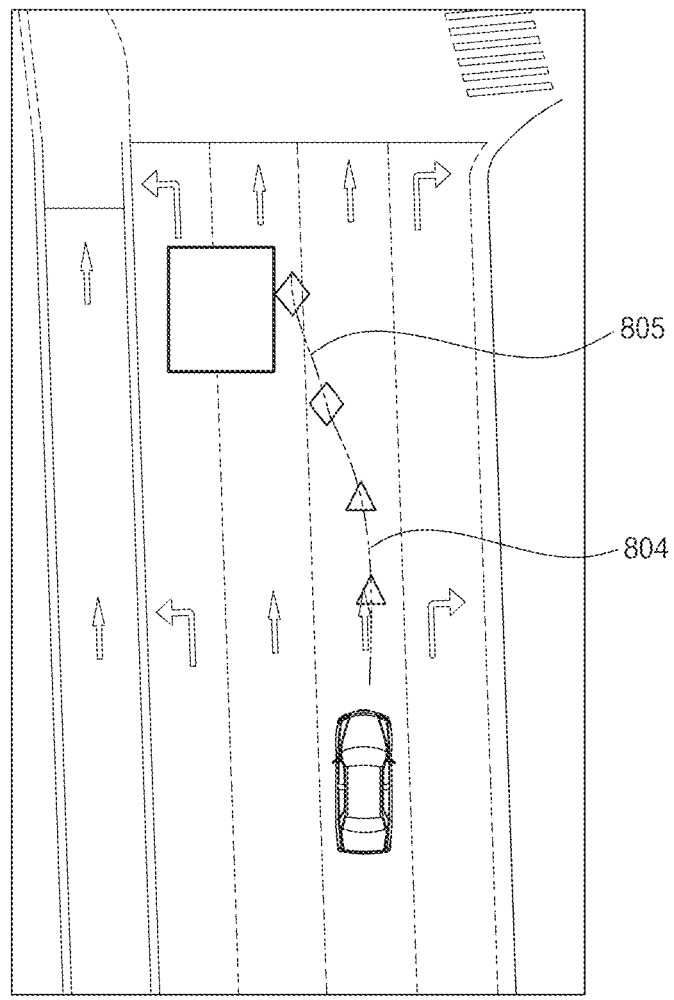

Furthermore, as illustrated in FIG. 8D, the remote control apparatus 210 may display different colors for only a portion of the path. For example, the operator 230 may be able to easily identify a problematic section or a section requiring path adjustment by displaying only a section for which driving is impossible (section with a stationary object) on the current path 804 with a different color (red) 805.

Figure 9:
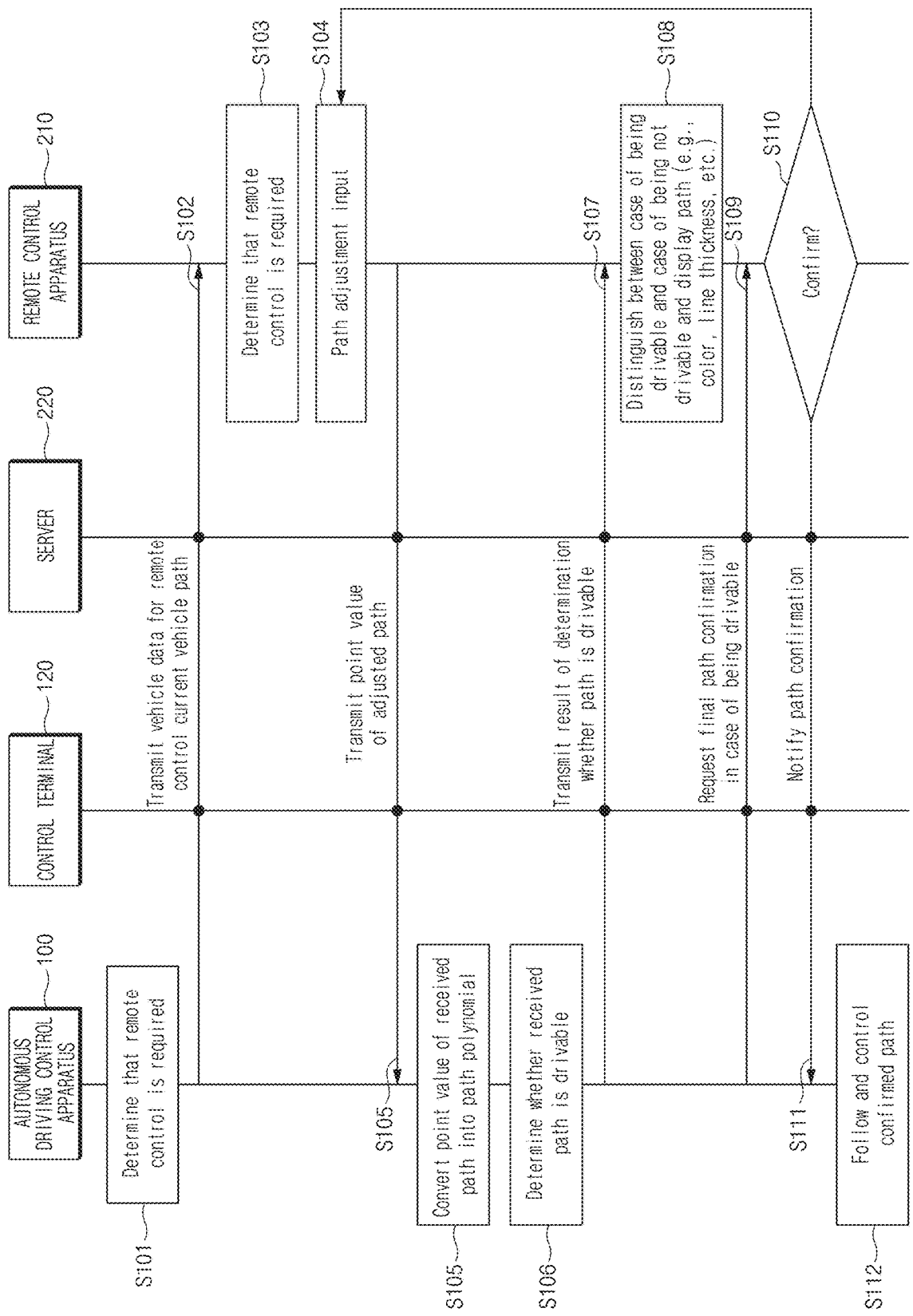
FIG. 9 illustrates a remote control method for an autonomous vehicle according to various exemplary embodiments of the present invention.

Hereinafter, a remote control method for an autonomous vehicle according to various exemplary embodiments of the present invention will be described in detail with reference to FIG. 9. FIG. 9 illustrates a remote control method for an autonomous vehicle according to various exemplary embodiments of the present invention.

Hereinafter, it is assumed that the autonomous driving control apparatus 100 of the of FIG. 1 performs processes of FIG. 9. Furthermore, in the description of FIG. 9, it may be understood that operations referred to as being performed by each device are controlled by a processor of each of the devices. In FIG. 9, the autonomous driving control apparatus 100 of the vehicle 10 and the remote control apparatus 210 of the control system 20 may perform communication through a control terminal 1200 and a server 220, respectively.

Referring to FIG. 9, the autonomous driving control apparatus 100 determines whether the remote control of the vehicle is required (S101). That is, the autonomous driving control apparatus 100 may determine that the remote control is required when the vehicle cannot normally follow a path to a destination while driving in the autonomous driving mode (e.g., road construction, an accident, etc.). In the instant case, the control system 20 may also receive vehicle data periodically from the autonomous driving control apparatus 100 of the vehicle to confirm that the remote control is required. Accordingly, when both the vehicle and an operator of the control system 20 recognize that the remote control is required, the remote control may be started.

When the remote control of the vehicle is required, the autonomous driving control apparatus 100 transmits the vehicle data for remote control and the current path of the vehicle to the remote control apparatus 210 through the control terminal 120 and the server 220 (S102). In the instant case, the vehicle data may include image information around the vehicle, surrounding object information, position and speed information of the vehicle, indoor image information, and the like.

Accordingly, the remote control apparatus 210 may display the vehicle data received from the autonomous driving control apparatus 100 of the vehicle 10, which is a remote control target, on the screen, to enable the operator 230 to check it (S103). That is, the remote control apparatus 210 may display a map corresponding to the vehicle and a traveling path on a screen based on a current position of the vehicle 10. In the instant case, the map may be a precision map including a static object. Furthermore, the remote control apparatus 210 may overlap and display a vehicle position and surrounding object information on the map. Furthermore, a current traveling path of the vehicle may include a path polynomial and one or more equally spaced points P1, P2, P3, P4, and P5.

The remote control apparatus 210 receives adjustment of the current path of the vehicle from the operator 230 (S104), and transmits a path point value adjusted by the operator 230 to the autonomous driving control apparatus 100 of the vehicle 10 (S105). In the instant case, the remote control apparatus 210 allows the operator 230 to adjust the point of the current path of the vehicle by a mouse or a touch method based on pieces of information displayed on the screen.

Next, the autonomous driving control apparatus 100 of the vehicle 10 converts the point value of the received path into a path polynomial (S105), and determines whether the received path is drivable (S106). That is, the autonomous driving control apparatus 100 may determine whether driving is possible by determining whether other obstacles exist on the path adjusted by the control system 20, and whether there is a shoulder or the like.

Next, the autonomous driving control apparatus 100 of the vehicle 10 transmits the received result of determining whether the path is drivable to the remote control apparatus 210 of the control system 20 (S107).

Accordingly, the remote control apparatus 210 distinguishes between a case where the path adjusted by the operator 230 is drivable and a case where the path is not drivable, and displays the adjusted path on the screen (S108).

For example, a color, hatching, a thickness, etc. of a non-drivable path 601 as illustrated in FIG. 6A and a drivable path 602 as illustrated in FIG. 6B may be separately displayed.

Furthermore, when it is determined that the path received from the control system 20 is drivable, the autonomous driving control apparatus 100 may request confirmation of a final path to the remote control apparatus 210 (S109).

Accordingly, the remote control apparatus 210 performs final confirmation on the drivable path (S110), and upon completion of the confirmation, the remote control apparatus 210 reports the confirmation of the final path to the autonomous driving control apparatus 210 (S111). In the instant case, the final path confirmation process of steps S109 to S111 may be omitted.

Next, the autonomous driving control apparatus 110 performs tracking control based on the confirmed path (S112).

Accordingly, according to various exemplary embodiments of the present invention, the operator 230 of the control system 20 may adjust the current path of the vehicle 10 through the remote control apparatus 210 to enable autonomous driving to be continued when it is determined that the remote control of the autonomous vehicle is required. Furthermore, according to various exemplary embodiments of the present invention, the current path may be adjusted to enable the operator to intuitively avoid obstacles and the like by displaying vehicle data such as the current path and the obstacles on the screen to be recognized at a glance when the operator 230 requires the remote control of the autonomous vehicle. Accordingly, the present invention helps to ensure smooth driving when providing services such as passenger transportation and physical distribution transportation by use of the autonomous vehicle.

Figure 10:
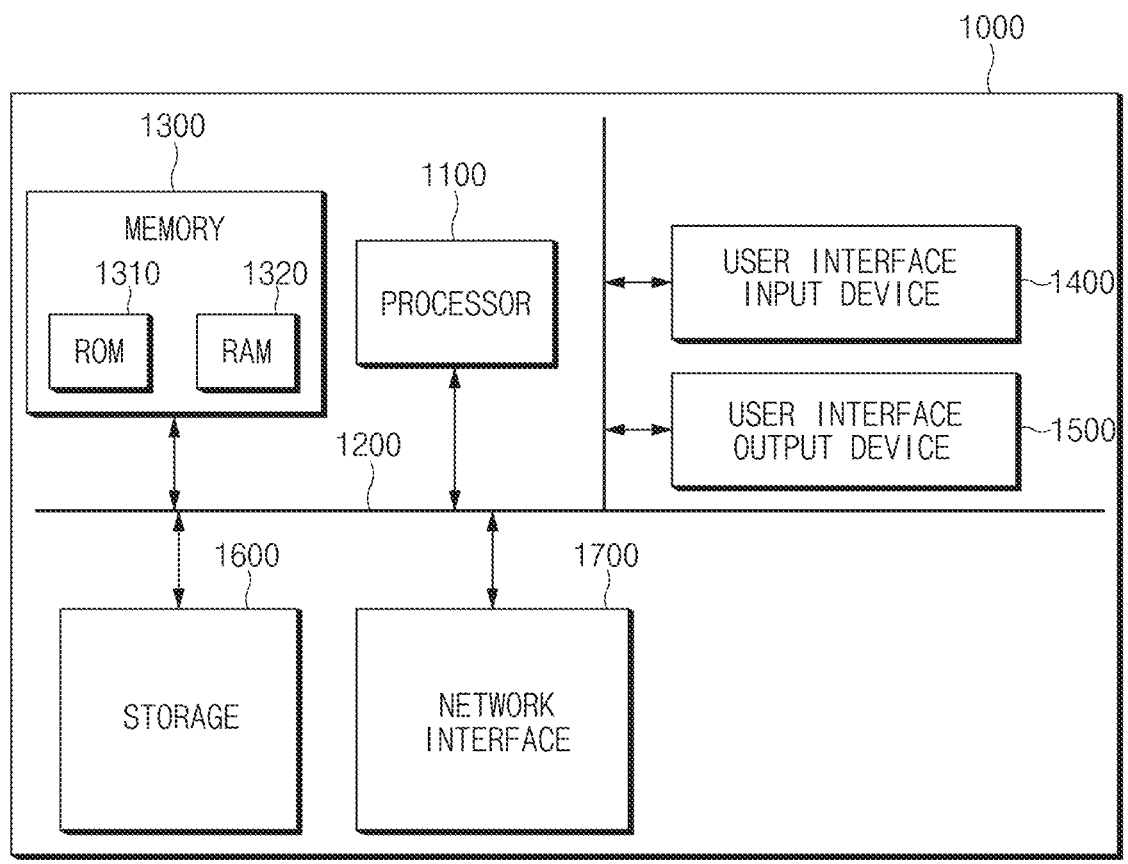
FIG. 10 illustrates a determining system according to various exemplary embodiments of the present invention.

FIG. 10 illustrates a computing system according to various exemplary embodiments of the present invention.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous vehicle comprising:
an autonomous driving control apparatus including a processor that transmits vehicle data and a vehicle path for remote control of the autonomous vehicle to a control system when the remote control of the autonomous vehicle is required, and performs following and control based on adjusted path information when receiving the adjusted path information from the control system,
wherein the processor is configured to receive an adjusted point value of an adjusted path from the control system,
wherein the processor is configured to distinguish between a first path to points moved whenever one or more points are moved and a second path to points not yet moved by use of at least one of a color, a line shape, a line thickness, or a line depth, and
wherein the adjusted path includes the first path and the second path.

2. The autonomous vehicle of claim 1, wherein the processor is configured to adjust a path based on the adjusted point value of the adjusted path, and to determine whether the adjusted path is drivable.

3. The autonomous vehicle of claim 2, wherein the processor is configured to transmit a result of determining whether the adjusted path is drivable to the control system.

4. The autonomous vehicle of claim 3, wherein the processor is configured to request final confirmation to the control system when the processor concludes that the adjusted path is drivable, and configured to follow and control a corresponding path when receiving the final confirmation from the control system.

5. The autonomous vehicle of claim 1, wherein the processor is configured to determine a situation in which the autonomous vehicle is unable to travel on an existing path due to a driving situation or an emergency situation as a situation requiring the remote control.

6. The autonomous vehicle of claim 1, wherein the processor is configured to transmit at least one candidate path including a current path of a current vehicle to the control system.

7. A control system comprising:
- a display device configured to display a vehicle path of an autonomous vehicle on a screen of the display device; and
- a processor configured to construct map information based on a current vehicle path and vehicle data received from the autonomous vehicle when remote control of the autonomous vehicle is required to display the map information on the display device, and to receive adjustment of the vehicle path on the map information from an operator to transmit the adjusted vehicle path to the autonomous vehicle, wherein the processor is configured to:
adjust point value of the current vehicle path received from the autonomous vehicle, and
transmit the adjusted point value of the adjusted vehicle path to the autonomous vehicle,
wherein the processor is configured to distinguish between a first path to points moved whenever one or more points are moved and a second path to points not yet moved by use of at least one of a color, a line shape, a line thickness, or a line depth, and
wherein the adjusted vehicle path includes the first path and the second path.

8. The control system of claim 7, wherein the processor is configured to display the one or more points positioned at equal intervals on the current vehicle path on the display device.

9. The control system of claim 8, wherein the processor is configured to adjust the current vehicle path depending on movement of the one or more points on the current vehicle path on a map.

10. The control system of claim 8, wherein the processor is configured to move the one or more points through a mouse or touch input.

11. The control system of claim 10, wherein the processor is configured to distinguish the adjusted vehicle path by use of at least one of a color, a line shape, a line thickness, or a line depth of the adjusted vehicle path depending on whether the adjusted vehicle path is drivable.

12. The control system of claim 11, wherein the processor stepwise changes at least one of the color, the line shape, the line thickness, or the line depth of the adjusted vehicle path whenever the one or more points are moved.

13. The control system of claim 11, wherein the processor, when the current vehicle path includes a first point, a second point, and a third point, changes at least one of a color, a line shape, a line thickness, or a line depth of a path to the first point when the first point is moved.

14. The control system of claim 7, wherein the processor is configured to distinguish the adjusted vehicle path depending on whether the adjusted vehicle path is drivable and displays the adjusted vehicle path on the display device when receiving a result of determining whether the adjusted vehicle path is drivable from the autonomous vehicle.

15. The control system of claim 7, wherein the processor, when receiving one or more candidate paths from the vehicle, distinguishes between a main path having a high priority and other candidate paths among the one or more candidate paths by use of at least one of a color, a line shape, a line thickness, or a line depth thereof.

16. A remote control method for an autonomous vehicle, the remote control method comprising:
- receiving, by a control system, a current vehicle path and vehicle data received from the autonomous vehicle when remote control of the autonomous vehicle is required;
- constructing and displaying, by the control system, map information based on the received vehicle data and the current vehicle path;
- adjusting, by the control system, point value of the current vehicle path received from the autonomous vehicle; and
- transmitting, by the control system, the adjusted point value of the adjusted vehicle path to the autonomous vehicle, wherein the control system is configured to distinguish between a first path to points moved whenever one or more points are moved and a second path to points not yet moved by use of at least one of a color, a line shape, a line thickness, or a line depth, and
wherein the adjusted vehicle path includes the first path and the second path.

17. The remote control method of claim 16, wherein the constructing and displaying the map information includes displaying the one or more points positioned at equal intervals on the current vehicle path.

* * * * *